(12) United States Patent
Andreina

(10) Patent No.: US 11,580,256 B2
(45) Date of Patent: Feb. 14, 2023

(54) EFFICIENT DENIABLE COMMITMENT OF DATA AND UNLINKABLE PROOF OF COMMITMENT FOR SECURING USER PRIVACY IN A DIGITAL IDENTITY SYSTEM

(71) Applicant: NEC Laboratories Europe GmbH, Heidelberg (DE)

(72) Inventor: Sebastien Andreina, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 16/882,765

(22) Filed: May 26, 2020

(65) Prior Publication Data
US 2021/0374274 A1 Dec. 2, 2021

(51) Int. Cl.
*G06F 21/62* (2013.01)
*G06F 16/23* (2019.01)
*H04L 9/32* (2006.01)

(52) U.S. Cl.
CPC ...... *G06F 21/6245* (2013.01); *G06F 16/2379* (2019.01); *H04L 9/3221* (2013.01)

(58) Field of Classification Search
CPC ...... G06F 21/60; G06F 21/62; G06F 21/6245; G06F 16/2379; G06F 21/6209; G06F 21/6218; G06F 21/6227; G06F 21/64; G06F 16/1824; G06F 21/44; G06F 21/629; G06F 16/9027; H04L 9/3221; H04L 9/0643; H04L 9/30; H04L 2209/38; H04L 9/0637; H04L 9/0618; H04L 9/3247; H04L 9/3239; H04L 9/3263; H04L 2209/56; H04L 9/0656; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583
See application file for complete search history.

(56) References Cited

U.S. PATENT DOCUMENTS

2019/0312727 A1* 10/2019 Del Pino .............. H04L 9/3247
2020/0313897 A1* 10/2020 Heath .................. H04L 9/3263
(Continued)

FOREIGN PATENT DOCUMENTS

WO  WO 2019/180588 A1  9/2019

OTHER PUBLICATIONS

Harikrishnan M and Lakshmy KV, "Secure Digital Service Payments using Zero Knowledge Proof in Distributed Network", 2019 5th International Conference on Advanced Computing & Communication Systems (ICACCS), IEEE, US, Mar. 15, 2019 (Mar. 15, 2019), pp. 307-312, XP033559143.
(Continued)

*Primary Examiner* — Malcolm Cribbs
(74) *Attorney, Agent, or Firm* — Leydig, Voit & Mayer, Ltd.

(57) ABSTRACT

A method of generating a deniable commitment of personal data of a user with an unlinkable proof of the commitment of the personal data for securing user privacy in a digital identity system includes receiving the personal data of the user and receiving the commitment of the personal data according to a commitment scheme. An interactive zero-knowledge proof is engaged in with the user so as to verify that the commitment of the personal data opens to the personal data of the user.

15 Claims, 2 Drawing Sheets

(56) References Cited

U.S. PATENT DOCUMENTS

2020/0328893 A1* 10/2020 Westland .............. H04L 9/3239
2021/0184864 A1*  6/2021 Wentz ................... H04L 9/3218

OTHER PUBLICATIONS

Galal, Hisham S. and Amr M. Youssef, "Verifiable Sealed-Bid Auction on the Ethereum Blockchain", Feb. 10, 2019 (Feb. 10, 2019), Advances in Intelligent Data Analysis XIX; [Lecture Notes in Computer Science; Lect.Notes Computer], Springer International Publishing, Cham, Germany, pp. 265-278, XP047568884.

* cited by examiner

EFFICIENT DENIABLE COMMITMENT OF DATA AND UNLINKABLE PROOF OF COMMITMENT FOR SECURING USER PRIVACY IN A DIGITAL IDENTITY SYSTEM

FIELD

The present invention relates to a method and system for improving the privacy of users in a digital identity system, and for increasing the security of the digital identity system in the case of data leaks.

BACKGROUND

Many types of computer systems, and in particular digital identity systems as computerized platforms for verifying digital identities of users, require users to commit to their digital personal data on some potentially public platform in order to ensure that the data is not being tampered with following the commitment. A platform could be public by design and only store the commitments, while the data itself can either be stored securely on a cloud storage (using proper encryption) or locally on the device (e.g., smartphone/laptop) of the user. Blockchains can be used for storing commitments of data, but are inappropriate for storing large amounts of data or personal data. In this case, users are required to bind their public key to their data by means of the commitments of the data to the blockchain. Depending on the use case, users may be required to share their digital personal data with a third-party entity, which will then be able to verify that the data has not been tampered with since the user registered their commitment to that data.

However, as evident by massive data leaks which continue to occur every few months, no computer system or network can be expected to be completely safe against data leak. Once the data of a user is leaked, it becomes easy to recompute its respective commitment and find the public key of the user. Once the binding of the public key and the personal data is recomputed, it can become relatively easy to track the whole digital history of a person, such as with which entity she interacted, or any other information stored about the public key of the user. The amount of personal information of a user which can be recovered with this knowledge of the public key will only increase with the rise of digital identities.

SUMMARY

In an embodiment, the present invention provides a method of generating a deniable commitment of personal data of a user with an unlinkable proof of the commitment of the personal data for securing user privacy in a digital identity system. The method includes receiving the personal data of the user and receiving the commitment of the personal data according to a commitment scheme. An interactive zero-knowledge proof is engaged in with the user so as to verify that the commitment of the personal data opens to the personal data of the user.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
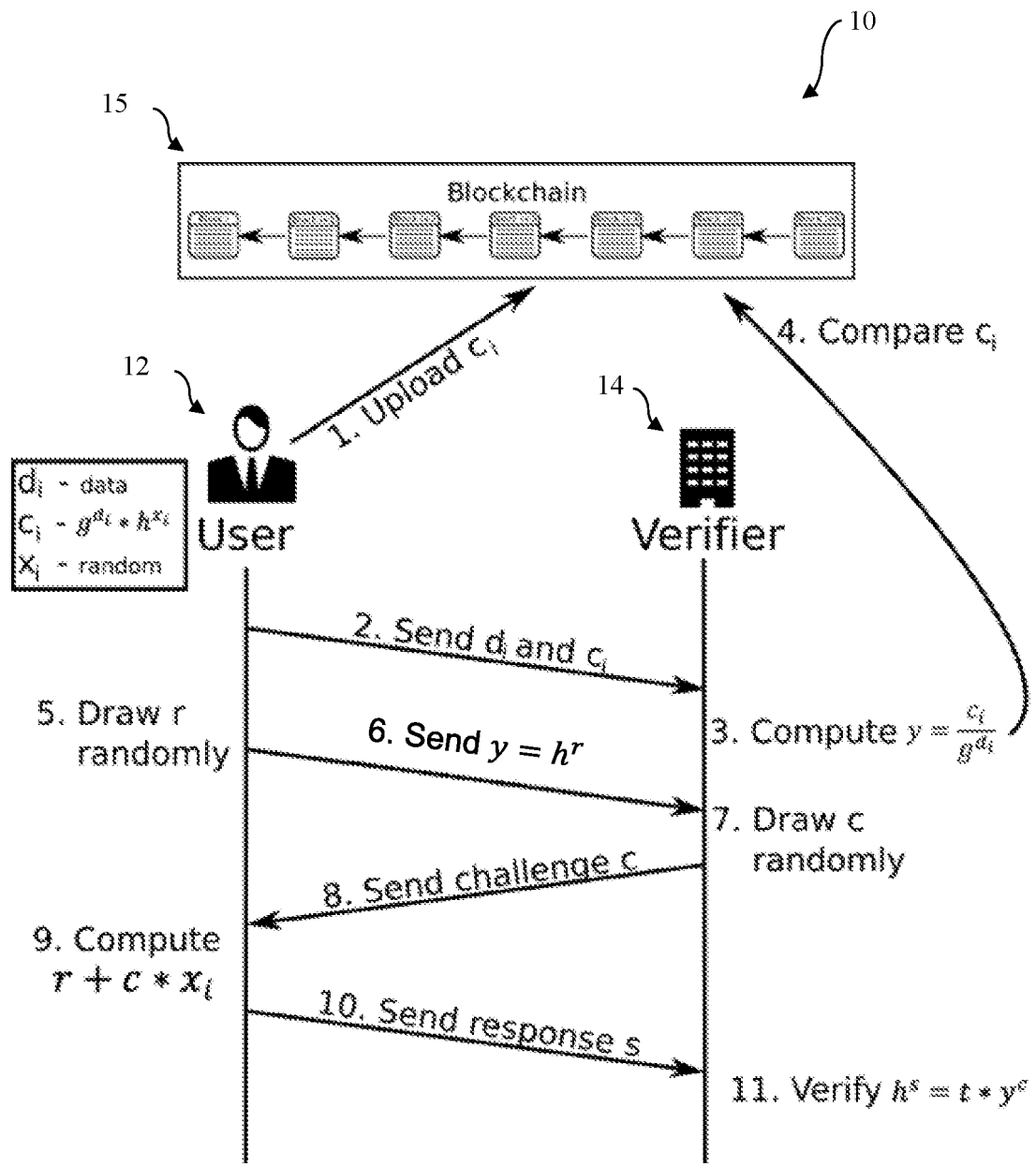
FIG. 1 schematically illustrates a method and system for a user to generate a commitment and prove its opening to a verifier using a blockchain in accordance with an embodiment of the present invention.

Embodiments of the present invention provide a method and system for improving the privacy of users in a digital identity system, and for increasing the security of the digital identity system in a case of a data leak. In particular, embodiments of the present invention use a new schema to open a commitment scheme, which according to an embodiment is a Pedersen commitment, in order to ensure forward privacy to the owner of the data, which is committed according to the Pedersen commitment, e.g., to a blockchain or distributed ledger. Embodiment of the present invention also leverage a zero-knowledge proof, which according to an embodiment is a Schnorr proof, to prove the opening of the commitment in order to ensure that, even in the case of a data leak, the data cannot be linked back to its commitment. Embodiments of the present invention can therefore be used to improve user privacy and enhance the security of a digital identity system, by ensuring forward privacy and preventing the linkability of personal data of a user to their public keys, thereby improving the privacy of users especially in a case of a data leak.

Accordingly, embodiments of the present invention improve the privacy of users of a digital identity system, and enhance the security of the digital identity system itself, by preventing linkability between personal data (e.g., personal identification documents) and the commitments of that data, even after the commitment has been opened. Embodiments of the present invention ensure that, even if the personal data is leaked, one cannot link the data to the commitments of that data, and therefore to the public key corresponding to a user that uploaded the personal data, effectively ensuring unlinkability between physical identity and digital identity.

Embodiments of the present invention improve the privacy of the users and prevent the linkability of private personal data to the public key of a particular user, even in the case of a data leak, by leveraging and combining two cryptographic primitives, in particular, a Pedersen commitment and a Schnorr proof. The Pedersen commitment of the data can be safely uploaded or stored on a public platform, such as a blockchain. Upon sharing the data with a third party, the user performs an interactive proof with the third party in order to convince the third party that the data has not been tampered with since committing to the data with the Pedersen commitment. Since the Schnorr proof is a zero-knowledge proof, its output can be simulated and therefore provide no information to any third party, effectively preventing linking of the data to a user, even in a case of a data leak.

In preferred embodiments, the method and system are applied to improve, in particular, a blockchain-based digital identity system for document verification. In such a digital identity system, the users would be able to register their public key on the blockchain along with commitments of their personal data (e.g., digital personal identification documents such as a digital passport, diplomas, proof of employment, proof of residency, etc.) in order to provide simplified and enhanced identity verification when interacting with entities that are required by law to verify the identity of their customers. Such entities can be, for example, financial institutes or insurance companies. Other third parties may also require to verify user identity before interacting with users. Third parties who use the digital identity system to verify user identity are also referred to herein as relying entities.

In order to use the digital identity system, users are first invited to register. The registration takes as input the public keys of the users, commitments of their personal data and a signature to ensure the integrity of the previous fields. Upon completion of their registration, users can request to have their documents verified. To do this, a user first has to start an interaction with a verifying entity (also referred to herein as a verifier) that is part of the blockchain-based digital identity system. According to an embodiment, the verifying entity can be a first relying party as defined above who verifies that the identity documents are correct. Once the documents of a user are verified, the result of the verification is shared on the blockchain. Afterwards, the user can use this shared result as the user's digital identity to prove to a relying entity that the documents which have been verified, such as a digital passport of the user, are valid. This allows the user to save time and receive better service, while at the same time saving computational resources and providing computational and time-related cost reductions for the relying parties, as they do not have to verify the documents of all their users. Even though relying parties can be convinced of the validity of a document, it can often be the case that the relying parties would still need to store a digital copy on their local server due to regulations. Upon receiving of the digital copy, however, the relying entity can simply trust the data of the digital copy if it matches the commitment on the blockchain that was written as verified by a verifying entity.

Although it is generally the case that the relying parties are honest, as they typically do not wish to lose their business share, the relying parties can act maliciously, have system failures or breaches, get hacked or have a data leak. Embodiments of the present invention protect against these technical vulnerabilities of the computer systems of the relying entities, as well as verifying entities, and improve the privacy of users even in a case of a data leak by preventing the linkage between their physical identity with their digital identity. In contrast, in the case of a data leak by a relying party prior to the present invention where the protocol uses a normal commitment scheme, any person gaining access to the digital copy of a personal document can then recompute the opening of the commitment in order to find to which public key it fits, effectively leaking all the privacy of the user. Accordingly, the new process of opening a commitment scheme in accordance with embodiments of the present invention improves user privacy and enhances security of a digital identity system which uses the commitments by ensuring that it is not possible to link the personal data to the public key of the owner of that data.

A commitment scheme is a cryptographic primitive which allows one to commit to a chosen value. Interactions in a commitment scheme take place typically in two phases: the commit phase, during which a value is chosen and the commitment is created, and the reveal phase during which the commitment is open to the chosen value. Commitment schemes require two main properties: the binding property and the hiding property. The binding property enforces that a commitment scheme can only be opened to the chosen value, while the hiding property ensures that one cannot extract the value out of the commitment during the commit phase.

A commitment scheme is therefore is a primitive that takes as input some data and outputs a commitment. The hiding property of the commitment scheme ensures that one cannot extract the data from the commitment, it can therefore be shared or be made public. During the reveal phase, the commitment can be opened to its value. A verifier is ensured of the validity of the commitment as the binding property prevents a commitment to open to two different opening. An example of commitment scheme can be the Pedersen commitment scheme. It works on a group of prime order p, with two generators g and h. The commit phase is performed as follows: The data data is hashed to the value d=sha256 (data). The commitment is then computed as $c=g^d*h^x$ for an x chosen at random. Even if c is published, it is theoretically impossible to extract the value d out of it. During the opening, upon revealing the values d and x, one can indeed see that the commitment was computed as $c=g^d*h^x$. The binding property of this scheme is based on the discrete logarithm problem If someone can find another set of values as (d', x') such that $c=g^{d'}*h^{x'}$, it would imply that one can compute the discrete logarithm of h in base g, which is considered a hard problem.

The Pedersen commitment as an example of a commitment scheme which can be used in accordance with an embodiment of the present invention is based on a group Z/pZ of prime order p, with generators g, h. The commitment c is computed as $c=g^x*h^r$, where x is the data to commit to (e.g., a hash of the data), and r is a random number. In order to open the commitment c, the user provides x, r such that the verifier can simply recompute c. The Pedersen commitment is secure as it is assumed that the discrete logarithm of h in base g is unknown. The security of the Pedersen commitment relies on the discrete logarithm assumption.

Zero-knowledge proofs, such as the Schnorr proof, are an interactive protocol between a prover and a verifier. A transcript is the output of the interactions between them (e.g., if the prover sends message x, the verifier message c, and the prover replies with the message s, the transcript would be (x, c, s)). With a normal proof, having access to the transcript would be enough to know that the prover indeed had knowledge of some secret. The goal of a zero-knowledge proof is to ensure that the transcript does not reveal any information. This mean that if an entity receives the transcript (x, c, s) from a zero-knowledge proof, the entity would not be able to know whether the prover really knew a secret, or whether the verifier is acting dishonestly. Formally, this property is proven by showing the existence of a simulator that can generate fake transcripts that are indistinguishable from a real transcript.

A Schnorr proof is an example of a zero-knowledge proof of knowledge used in accordance with an embodiment of the present invention to prove to a verifier that one knows the discrete logarithm of a given value. A normal setup would be, the prover wishes to prove to the verifier that she knows x such that $y=g^x$, with g a generator of a group Z/pZ of prime order q. To do so, the prover first sends a message $t=g^r$, r chosen at random, to the verifier. The verifier replies with a challenge c chosen at random. The prover can then compute the response $s=r+c*x$ and sends this last message to the verifier. The verifier is convinced that the prover knows x such that $y=g^x$ if it can verify that $g^s=t*y^c$.

In other words, according to an embodiment of the present invention, Schnorr identification scheme allows a prover P to prove in zero-knowledge to a verifier V knowledge of the discrete logarithm of an element in a cyclic group of prime order. It works as follows: G represents a cyclic group of prime order p where the computational discrete logarithm assumption holds; g is a public generator of G; $y=g^x \mod p$ where x is only known to P; $Z_p$ is a multiplicative group of integers that are co-prime with p; and r, c and s are elements of $Z_p$ (an integer co-prime with p). The operations are done in the group Z/pZ of prime order q, meaning that all operations are performed modulo p. In this case, mod p means the operation are performed in the group generated by p. The Schnorr identification scheme then works as follows:

P picks $r \in Z_p$ uniformly at random and sends $t=g^r \mod p$ to V

V picks $c \in Z_p$ uniformly at random and sends it to P

P computes $s=r+cx \mod p$ and sends it to V

V accepts the proof as valid if $g^s = t \cdot y^c$

In an embodiment, the present invention provides a method of generating a deniable commitment of personal data of a user with an unlinkable proof of the commitment of the personal data for securing user privacy in a digital identity system. The method includes receiving the personal data of the user and receiving the commitment of the personal data according to a commitment scheme. An interactive zero-knowledge proof is engaged in with the user so as to verify that the commitment of the personal data opens to the personal data of the user.

In an embodiment, the zero-knowledge proof is a Schnorr proof.

In an embodiment, the commitment of the personal data is a Pederson commitment.

In an embodiment, the user is registered to a blockchain and has committed the personal data to the blockchain.

In an embodiment, the method further comprises checking whether the received commitment of the personal data, which is received from the user, is the same as the commitment of the personal data which was committed by the user to the blockchain.

In an embodiment, the commitment of the personal data was computed as a Pedersen commitment as $c_i = g^{d_i} * h^{x_i}$, wherein g and h are prime order generators, $d_i$ represents a hah of the personal data i and $x_i$ represents as associated secret required to open the commitment.

In an embodiment, the interactive zero-knowledge proof is a Schnorr proof which comprises: receiving $t=h^r$ for a randomly selected r from the user; replying to the user with a randomly selected challenge c; receiving a response $s=r+c*x_i$; and verifying that $h^s = t*y^c$ to be convinced of the opening of the commitment $c_1$.

In an embodiment, the method further comprises recomputing $$y = \frac{c_i}{g^{d_i}}$$

in order to retrieve $$h^{x_i} = \frac{g^{d_i} * h^{x_i}}{g^{d_i}} = \frac{c_i}{g^{d_i}} = y.$$

In an embodiment, the method further comprises writing to a blockchain an indication that the commitment of the personal data opening to the personal data of the user has been verified such that third parties are able to rely on the indication in the blockchain to avoid a separate verification.

In another embodiment, which can include the features of the above embodiments in different combinations, the present invention provides a system comprising one or more processors which, alone or in combination, are configured to provide for execution of the following steps: receiving the personal data of the user; receiving the commitment of the personal data according to a commitment scheme; and engaging in an interactive zero-knowledge proof with the user so as to verify that the commitment of the personal data opens to the personal data of the user.

In an embodiment, the zero-knowledge proof is a Schnorr proof.

In an embodiment, the commitment of the personal data is a Pederson commitment.

In an embodiment, the user is registered to a blockchain and has committed the personal data to the blockchain.

In an embodiment, the system is registered to a same blockchain as the user and is further configured to write to the blockchain an indication that the commitment of the personal data opening to the personal data of the user has been verified such that third parties who are also registered to the blockchain are able to rely on the indication in the blockchain to avoid a separate verification.

In a further embodiment, the present invention provides a tangible, non-transitory computer-readable medium having instructions thereon which, upon being executed by one or more processors, alone or in combination, provide for execution of a method according to any embodiment of the present invention.

Embodiments of the present invention advantageously provide a deniable proof of commitment by combining both cryptographic primitives in order to strengthen the privacy of users in a commitment-based digital identity system. This is related to zero-knowledge proofs. The proof being deniable means that a third party cannot prove who is the owner of the commitment, or in other words, the owner can deny ownership even if the data is leaked. In a standard digital identity system, the users have a public key Pk and a number of commitments to this public key $c_1, c_2, c_3 \ldots$ of documents $d_1, d_2, d_3 \ldots$. An example of a commitment can be simply a salted hash of the document itself: $c_i = \text{Hash}(d_i | \text{salt}_i)$. In order to verify a commitment, a verifier that gains access to the document and the salt can simply recompute the commitment and check that the document has not been modified since being committed. In order to improve the privacy in case of data leakage and prevent the binding of a document with its owner's public key, embodiments of the present invention provide an improved commitment scheme.

An exemplary method and system 10 for implementing the improved commitment scheme using a blockchain 15 are schematically illustrated in FIG. 1. A user 12 first generates the commitment $c_i = g^{d_i} * h^{x_i}$, given the data $d_i$ for a random $x_i$, similarly to the Pedersen commitment. The random $x_i$ can be the key to open the commitment. As shown in step 1, the commitment $c_i$ is then uploaded on the blockchain 15. Then, upon starting a new interaction with a verifier 14, as shown in step 2, the user 12 sends their data $d_i$ and the commitment $c_i$ to the verifier 14. In step 3, the verifier 14 can recompute $$y = \frac{c_i}{g^{d_i}}$$

in order to retrieve $$h^{x_i} = \frac{g^{d_i} * h^{x_i}}{g^{d_i}} = \frac{c_i}{g^{d_i}} = y.$$

In sequence or in parallel, in step 4, the verifier 14 ensures that the commitment $c_i$ it received from the user 12 in step 2 is the same as the one the user 12 uploaded to the blockchain 15 during step 1. Through steps 5 to 10, the user 12 then proves the opening of the commitment $c_i$ through an interactive Schnorr proof with the verifier 14 in order to prove knowledge of $x_i$ such that $y=h^{x_i}$. Indeed, if the user 12 is able to prove that the user 12 knows the value of $x_i$, then it suffices to convince any verifier 14 that the data $d_i$ is the one that the commitment $c_i$ opens to, as it would otherwise imply that the user 12 is capable of computing the discrete logarithm of h in base g, which is deemed to be infeasible.

To do this, the user 12 selects a random r in step 5 and sends $y=h^r$ to the verifier 14 in step 6. The verifier 14 replies with a random challenge c in step 7. The user 12 computes the response $s=r+c*x_i$ in step 8 and sends it to the verifier 14 in step 9. The verifier 14 is convinced of the opening of the commitment $c_i$ if it can verify that $h^s=t*y^c$ is indeed correct in step 10. As mentioned above g and h are two different generators for the hash of the commitment and the Schnorr proof, respectively.

Since the Schnorr proof is a zero-knowledge proof, it does not hold any information in itself. This mean that even if the verifier 14 stores the transcript of the proof, it cannot convince any other entity that the proof was correct, thanks to the property of being a zero-knowledge proof. Indeed, a transcript of the proof can be simulated if one picks first the challenge c and chooses r based on c. To prove that the transcript of a proof does not leak any knowledge, it suffices to prove that the transcript can be simulated. In the case of the Schnorr proof, such a transcript can be generated as follows: draw s and c at random, and pick $r=h^s*y^{-c}$. The triplet (r, c, s) would be a valid transcript, but since r has been generated with knowledge of c/s it is a useless statement (as anyone can create such a transcript as here the knowledge of x was not required). This also mean that if one receives a valid transcript, it cannot be distinguished from a fake one. The only way to be able to know whether the transcript is valid is if one can see that the random r was chosen before the challenge c. This can only be done through the interaction.

Embodiments of the present invention therefore provide the improvements of preventing linkability of opened data ant its commitment by leveraging a combination of Schnorr proofs and Pedersen commitments. This improved the privacy of the users, and the security of digital identity systems, even in a case of data leak in a world where using digital identity and relying on the technical functioning of digital identity systems, is becoming the norm. In particular, embodiments of the present invention can be used to improve the security of new or existing digital identity systems by supporting an additional layer of security and privacy for the users In an embodiment, the present invention provides a method of generating an unlinkable deniable commitment of data, the method comprising the steps of:

1) A user 12 registers to the blockchain 15 and provides the commitments $c_i$ of the personal data $d_i$ (e.g. a personal identification document) of the user 12 computed through the method described above: $c_i=g^{d_i}*h^{x_i}$, for a random $x_i$.

2) If the user 12 wants to interact with a new entity (e.g., a verifier 14), the user 12 first sends their personal data $d_i$ to the new entity and the commitment $c_i$.

3) The user 12 further needs to prove that the commitment $c_i$ indeed opens to the data $d_i$. To achieve this, the user 12 does an interactive Schnorr proof with the new entity, comprising the sub-steps of:
   a. The user 12 sending $y=h^r$ for a randomly selected r.
   b. The new entity replying with a randomly selected challenge c.
   c. The user 12 sending the response $s=r+c*x_i$ to the new entity.
   d. The new entity verifying that $h^s=t*y^c$ to be convinced of the opening of the commitment $c_i$.

4) The new entity is convinced that the personal data $d_i$ has been used to generate the commitment $c_i$ based on the interactive Schnorr proof and can continue the process knowing the personal data $d_i$ has not been modified.

5) In the case the commitment $c_i$ was already written as verified on the blockchain by another third party, the new entity can be ensured that this third party and itself have seen the same document, and can use the fact that the validity of the personal document was already verified, thereby saving computational resources, cost and time by not having to undergo a separate verification. The commitment of the data is binding, which means that one commitment can be open only to one hash of data (so an adversary can find two different hashes such that the protocol works). The commitment "commitment" is therefore shared first on the blockchain/public platform and is accessible to everyone. When the verifier verifies the data of the user, it then writes on this public platform, data linked to commitment "commitment" is valid. If a third party receives a commitment and can see it has been validated by the third party, it can be ensured that the third party and the verifier have seen the exact same piece of data.

Figure 2:
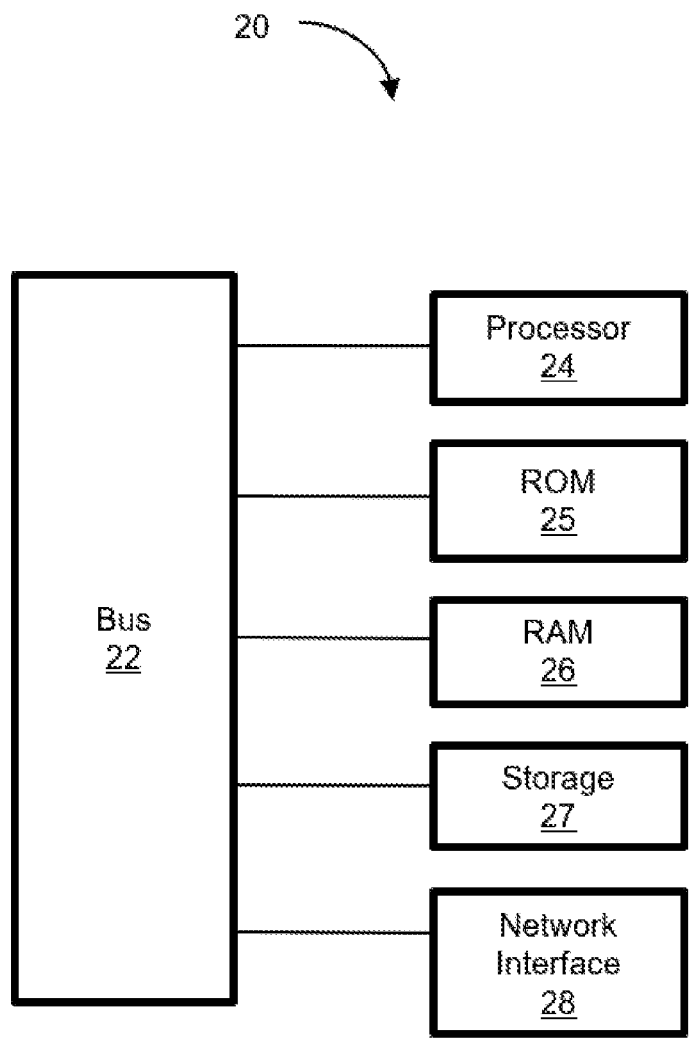
FIG. 2 schematically illustrates a processing system of computer devices used by entities in the method of FIG. 1.

FIG. 2 is a block diagram of a processing system 20 according to an embodiment of the user, verifier or relying entities, all of which should be understood to be computer entities in accordance with embodiments of the present invention. The processing system 20, which can be connected alone or with other devices to a bus 22, can be used to implement the protocols, devices, mechanisms, systems and methods described above. The processing system 20 includes a processor 24, such as a central processing unit (CPU) of a computing device or a distributed processor system. The processor 24 executes processor-executable instructions for performing the functions and methods described above. In embodiments, the processor executable instructions are locally stored or remotely stored and accessed from a non-transitory computer readable medium, such as storage 27, which may be a hard drive, cloud storage, flash drive, etc. Read-only memory (ROM) 25 includes processor-executable instructions for initializing the processor 24, while the random-access memory (RAM) 26 is the main memory for loading and processing instructions executed by the processor 24. The network interface 28 may connect to a wired network or cellular network and to a local area network or wide area network, such as the Internet, and may be used to receive and/or transmit data, including datasets such as datasets representing one or more images. In certain embodiments, multiple processors perform the functions of processor 24. The processing system 20 may be embodied in smartphones, tablets, servers or other types of computer devices.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of generating a deniable commitment of personal data of a user with an unlinkable proof of the deniable commitment of the personal data for securing user privacy in a digital identity system, the method comprising:
   receiving the personal data of the user;
   receiving the deniable commitment of the personal data according to a commitment scheme, wherein the deniable commitment is unlinked to the personal data; and
   engaging in an interactive zero-knowledge proof with the user so as to verify that the deniable commitment of the personal data opens to the personal data of the user.

2. The method according to claim 1, wherein the zero-knowledge proof is a Schnorr proof.

3. The method according to claim 1, wherein the deniable commitment of the personal data is a Pederson commitment.

4. The method according to claim 1, wherein the user is registered to a blockchain and has committed the personal data to the blockchain.

5. The method according to claim 4, further comprising checking whether the received deniable commitment of the personal data, which is received from the user, is the same as the deniable commitment of the personal data which was committed by the user to the blockchain.

6. The method according to claim 1, wherein the deniable commitment of the personal data was computed as a Pedersen commitment as $c_i = g^{d_i} * h^{x_i}$, wherein g and h are prime order generators, $d_i$ represents a hash of the personal data i and $x_i$ represents as associated secret required to open the deniable commitment.

7. The method according to claim 6, wherein the interactive zero-knowledge proof is a Schnorr proof which comprises:
   receiving $t = h^r$ for a randomly selected r from the user;
   replying to the user with a randomly selected challenge c;
   receiving a response $s = r + c * x_i$; and
   verifying that $h^s = t * y^c$ to be convinced of the opening of the deniable commitment $c_i$.

8. The method according to claim 7, further comprising recomputing $$y = \frac{c_i}{g^{d_i}}$$

in order to retrieve $$h^{x_i} = \frac{g^{d_i} * h^{x_i}}{g^{d_i}} = \frac{c_i}{g^{d_i}} = y.$$

9. The method according to claim 1, further comprising writing to a blockchain an indication that the deniable commitment of the personal data opening to the personal data of the user has been verified such that third parties are able to rely on the indication in the blockchain to avoid a separate verification.

10. A system comprising:
    one or more processors; and
    a tangible, non-transitory computer-readable medium having instructions thereon which, upon being executed by the one or more processors, alone or in combination, are configured to provide for execution of the following steps:
    receiving a personal data of a user;
    receiving a deniable commitment of the personal data according to a commitment scheme, wherein the deniable commitment is unlinked to the personal data; and
    engaging in an interactive zero-knowledge proof with the user so as to verify that the deniable commitment of the personal data opens to the personal data of the user.

11. The system according to claim 10, wherein the zero-knowledge proof is a Schnorr proof.

12. The system according to claim 10, wherein the deniable commitment of the personal data is a Pederson commitment.

13. The system according to claim 10, wherein the user is registered to a blockchain and has committed the personal data to the blockchain.

14. The system according to claim 10, wherein the system is registered to a same blockchain as the user, and wherein the instructions are further configured to provide for execution of the following step:
    writing to the blockchain an indication that the deniable commitment of the personal data opening to the personal data of the user has been verified such that third parties who are also registered to the blockchain are able to rely on the indication in the blockchain to avoid a separate verification.

15. A tangible, non-transitory computer-readable medium having instructions thereon which, upon being executed by one or more processors, alone or in combination, provide for execution of the following steps:
    receiving a personal data of a user;
    receiving a deniable commitment of the personal data according to a commitment scheme, wherein the deniable commitment is unlinked to the personal data; and
    engaging in an interactive zero-knowledge proof with the user so as to verify that the deniable commitment of the personal data opens to the personal data of the user.

* * * * *